United States Patent
Choi et al.

(10) Patent No.: US 9,083,219 B2
(45) Date of Patent: Jul. 14, 2015

(54) ROTOR AND MOTOR

(75) Inventors: Hong-Soon Choi, Seoul (KR); Jin-woo Cho, Seongnam-si (KR); Seong-Taek Lim, Suwon-si (KR)

(73) Assignees: SAMSUNG ELECTRONICS CO., LTD., Suwon-si (KR); Kyungpook National University Industry-Academic Cooperation Foundation, Daegu-si (KR)

( * ) Notice: Subject to any disclaimer, the term of this patent is extended or adjusted under 35 U.S.C. 154(b) by 438 days.

(21) Appl. No.: 13/449,104

(22) Filed: Apr. 17, 2012

(65) Prior Publication Data
US 2012/0299429 A1    Nov. 29, 2012

(30) Foreign Application Priority Data
May 26, 2011    (KR) .......................... 10-2011-0050342

(51) Int. Cl.
*H02K 21/12* (2006.01)
*H02K 1/27* (2006.01)

(52) U.S. Cl.
CPC .............. *H02K 1/2773* (2013.01); *H02K 1/276* (2013.01); *H02K 1/278* (2013.01)

(58) Field of Classification Search
CPC .............................. H02K 1/276; H02K 1/278

USPC ........................... 310/156.83, 156.57, 156.07
See application file for complete search history.

(56) References Cited

U.S. PATENT DOCUMENTS

| | | | |
|---|---|---|---|
| 6,147,428 A * | 11/2000 | Takezawa et al. ....... | 310/156.57 |
| 7,196,446 B2 * | 3/2007 | Hans ........................ | 310/156.53 |
| 7,321,177 B2 | 1/2008 | Uchida et al. | |
| 7,459,821 B2 * | 12/2008 | Ho Cheong et al. ..... | 310/156.57 |
| 7,851,958 B2 * | 12/2010 | Cai et al. .................. | 310/156.53 |
| 2003/0030343 A1 * | 2/2003 | Naito et al. ............... | 310/156.56 |
| 2004/0046472 A1 * | 3/2004 | Noda et al. ............... | 310/156.78 |

FOREIGN PATENT DOCUMENTS

| | | |
|---|---|---|
| JP | 739091 A | 2/1995 |
| JP | 200060038 A | 2/2000 |
| JP | 2002186244 A | 6/2002 |
| JP | 200614457 A | 1/2006 |

* cited by examiner

*Primary Examiner* — Hanh Nguyen
(74) *Attorney, Agent, or Firm* — Sughrue Mion, PLLC

(57) ABSTRACT

A rotor and a motor are provided in which the q-axis inductance is increased and the leakage of magnetic flux is prevented to ensure high power operation at high level driving speeds. The rotor includes a rotor core, which is formed at the center thereof with a hole coupled to a shaft, and a module configured to be coupled to the rotor core and comprises a pair of first permanent magnets, which are space apart from each other, and a first connection part connecting ends of the first permanent magnets to each other.

20 Claims, 9 Drawing Sheets

<GENERAL SPOKE TYPE MOTOR>   <EXAMPLE OF MOTOR>

|  | GENERAL SPOKE TYPE MOTOR | EXAMPLE OF MOTOR | Increase (%) |
|---|---|---|---|
| Ld [mH] | 0.160 | 0.159 | -0.7% |
| Lq [mH] | 0.202 | 0.228 | 12.5% |
| Lq - Ld [mH] | 0.042 | 0.069 | 62.8% |

600a

ROTOR AND MOTOR

CROSS-REFERENCE TO RELATED PATENT APPLICATION

This application claims the benefit of Korean Patent Application No. 10-2011-0050342 under 35 U.S.C. §119(a), filed on May 26, 2011, the disclosure of which is hereby incorporated by reference in its entirety.

BACKGROUND

1. Field

The following description relates to a rotor and a motor providing high power operation at high level driving speeds.

2. Description of the Related Art

A motor is classified into a permanent magnet synchronous motor (PMSM), an induction motor, a switched reluctance motor (SRM), etc. The PMSM, uses a permanent magnet, has a high level of power density, a compact sized structure, and superior operation efficiency. In this regard, the PMSM is widely applied to a motor for hybrid vehicles or electric vehicles.

In general, the magnet used for the PMSM is formed using rare earth resources. For example, the rare earth resource magnet may be a Neodymium (NdFeB) magnet having superior residual magnetism (Br) and coercive force (Hc). However, the scarcity of rare earth resources causes high costs and wide cost fluctuations of the rare earth resource magnet.

Accordingly, there is a need for alternatives to the rare earth resources or a need for a motor manufacturing technology capable of providing a performance corresponding to that of a motor using rare earth resources without using rare earth resources.

SUMMARY

According to an aspect of the exemplary embodiments, there is provided a rotor including a rotor core and a module. The rotor core is formed at a center thereof with a hole coupled to a shaft. The module is configured to be coupled to the rotor core and comprises a pair of first permanent magnets, which are space apart from each other, and a first connection part connecting ends of the first permanent magnets to each other.

The first connection part connects ends of the first permanent magnets, adjacent to an inner side of the rotor core, to each other.

The first connection part is spaced apart from an inner surface of the rotor core.

The module includes a pair of second permanent magnets spaced apart from the first permanent magnets, and a second connection part connecting ends of the second permanent magnets to each other.

The module includes a third permanent magnet which is disposed at an outer side of the rotor core between the first permanent magnets.

The module is provided in an even number of modules, and the even number of modules are disposed on the rotor core while being spaced apart from each other and being spaced apart from an inner surface of the rotor core.

The module is buried in the rotor core.

The first connection part has a center part, which includes a permanent magnet or air, and a remaining part, which includes non-magnetic material or air.

The rotor core includes soft magnet material.

According to another aspect of the exemplary embodiments, there is provided a rotor including a rotor core and a plurality of modules. The rotor core is formed at a center thereof with a hole coupled to a shaft. Each of the modules is coupled to the rotor core while being spaced apart from an inner surface of the rotor core. The modules are provided in an even number of modules which are spaced apart from each other and include a pair of first permanent magnets spaced apart from each other and a first connection part connecting ends of the first permanent magnets that are adjacent to the inner surface of the rotor core to each other.

According to another aspect of the exemplary embodiments, there is provided a motor comprising a rotor, a shaft and a stator. The rotor includes a rotor core, which is formed at a center thereof with a hole coupled to a shaft. The rotor also includes a module, which is coupled to the rotor core, and comprises a pair of first permanent magnets spaced apart from each other and a first connection part connecting ends of the first permanent magnets to each other. The shaft is coupled to the hole. The stator is spaced apart from the rotor and comprises at least one slot around which a coil is wound.

The first connection part connects ends of the first permanent magnets to each other, the ends adjacent to an inner surface of the rotor core, and the first connection part is spaced apart from the inner surface of the rotor core.

The module includes a pair of second permanent magnets spaced apart from the first permanent magnets, and a second connection part connecting ends of the second permanent magnets to each other.

The module includes a third permanent magnet which is disposed at an outer side of the rotor core between the first permanent magnets.

The module is provided in an even number of modules and the even number of modules are disposed on the rotor core while being spaced apart from each other and being spaced apart from an inner surface of the rotor core.

The first connection part has a center part, which includes a permanent magnet or air, and a remaining part, which includes non-magnetic material or air.

The rotor core includes soft magnet material.

Other features will become apparent to those skilled in the art from the following detailed description, which, taken in conjunction with the attached drawings, discloses exemplary embodiments of the invention.

BRIEF DESCRIPTION OF THE DRAWINGS

These and/or other aspects of the exemplary embodiments will become apparent and more readily appreciated from the following description of the embodiments, taken in conjunction with the accompanying drawings of which.

Elements, features, and structures are denoted by the same reference numerals throughout the drawings and the detailed description, and the size and proportions of some elements may be exaggerated in the drawings for clarity and convenience.

DETAILED DESCRIPTION OF EXEMPLARY EMBODIMENTS

The following detailed description is provided to assist the reader in gaining a comprehensive understanding of the methods, apparatuses and/or systems described herein. Various changes, modifications, and equivalents of the systems, apparatuses and/or methods described herein will be evident to those of ordinary skill in the art. Descriptions of well-known functions and structures are omitted to enhance the clarity and conciseness of the disclosure.

Figure 1:
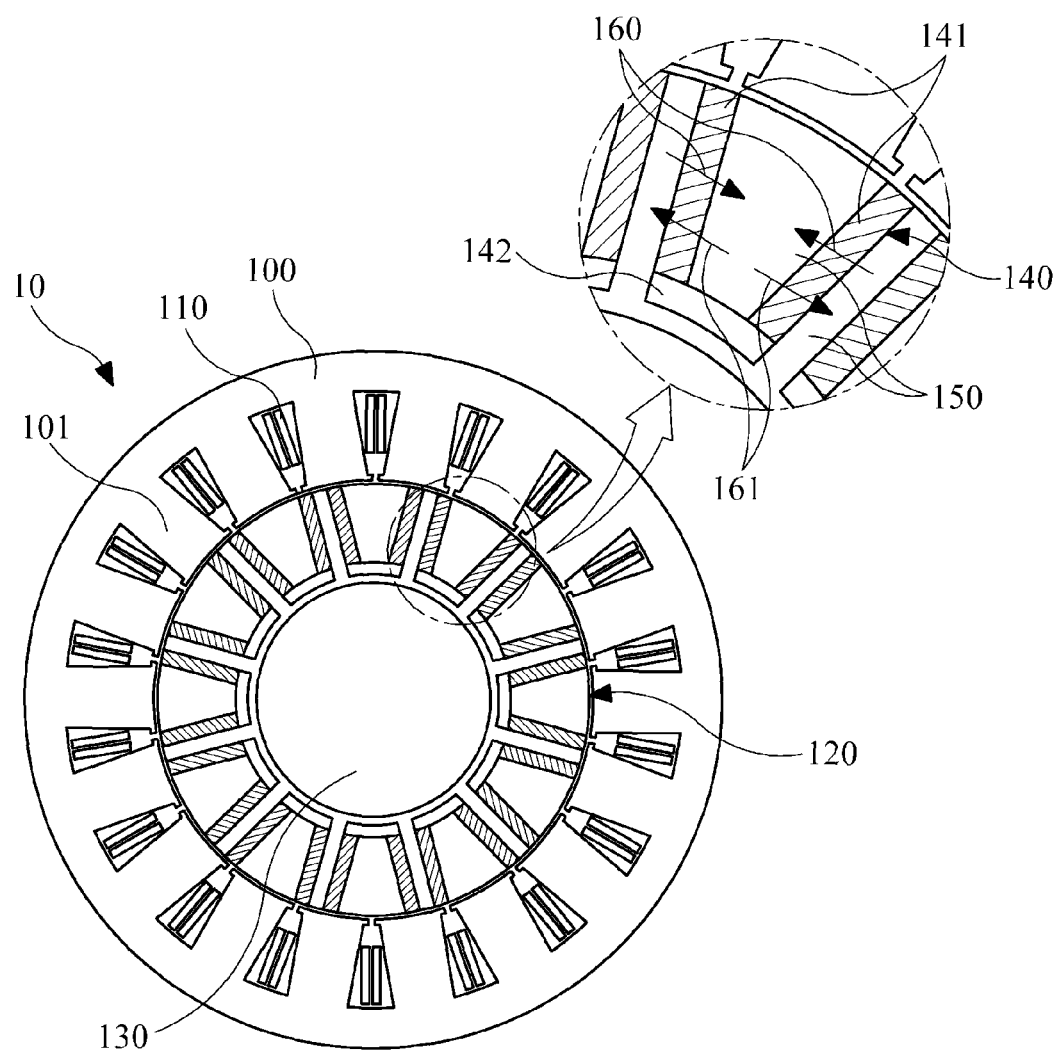
FIG. 1 is a cross sectional view showing the configuration of a motor according to an exemplary embodiment.

FIG. 1 is a cross sectional view showing the configuration of a motor according to an exemplary embodiment.

As shown in FIG. 1, a motor 10 includes a stator 100, a coil 110, a rotor 120 and a shaft 130.

The stator 100 includes at least one slot. A coil 110 is disposed of in the at least one slot. The stator 100 is fixed while being spaced apart from the rotor 120. The spacing between the stator 100 and the rotor 120 may be greater than 0.2 mm and less than 1.5 mm. The coil 110 is wound around teeth 101. The rotor may have a relative permeability (Mu) of between 1.0 and 1.5.

The rotor 120 may include a module 140 and a rotor core 150.

The module 140 may include a pair of first permanent magnets 141 and a first connection part 142.

The pair of first permanent magnets 141 are disposed in various forms. For example, the pair of first permanent magnets may be disposed in parallel to each other or in the form of an alphabet V. The pair of first permanent magnets 141 may include permanent magnets or hard magnetic material. The pair of first permanent magnets 141 may also include magnets which have a low Br value such as ferrite magnets as well as alloys of iron, nickel, ferrite, cobalt, and other magnetic materials such as lodestone. The pair of first permanent magnets may have a Br value between 0.3 Tesla and 1.5 Tesla. When permanent magnets having a higher Br value are used in the rotor structure, the number of required magnets will be reduced compared to when ferrite based magnets are used, without changing the entire structure of the rotor.

The pair of first permanent magnets 141 may be magnetized in opposite directions to each other along the circumferential direction. For example, the pair of the first permanent magnets 141 may be magnetized in a direction proceeding from the outside 160 of the first permanent magnet 141 to the inside of the first permanent magnet by passing through the first permanent magnet 141. Alternatively, the first permanent magnets 141 may be magnetized in a direction from the inside 161 of the first permanent magnet 141 to the outside of the first permanent magnet 141 by passing through the first permanent magnet 141.

The first connection part 142 connects ends of the first permanent magnets 141 to each other. For example, the first connection part 142 may connect ends of the first permanent magnets 141 adjacent to the inner side of the rotor core 150 to each other.

The first connection part 142 is disposed while being spaced apart from the inner surface of the rotor core 150. For example, the first connection part 142 may be spaced by a predetermined interval from the inner surface of the rotor core 150. The length in a circumferential direction of the first connection part 142 depends on the thickness in the radial direction of the first permanent magnets 141, and the thickness in radial direction of the first connection part 142 may be half the thickness in circumferential direction of the permanent magnets 141.

The first connection part 142 may include non-magnetic material or air. In the case that the first connection part 142 includes air, the first connection part 142 may include an empty space. Alternatively, the first connection part 142 may include a center part, which includes magnetic material, and a remaining part, which includes non-magnetic material or air. The magnetic material of the first connection part 142 may be the same material as the first permanent magnet 141 or a different material.

A variety of shapes of the module 140 will be described later in detail with reference to FIGS. 5A to 5D.

The rotor 120 may include an even number of modules 140. One of the even number modules 140 forms an north (N) pole at an outer side of the rotor core 150 and a nearby module forms a south (S) pole at an outer side of the rotor core 150. The detailed shape of the modules will be described with reference to FIG. 3.

The module 140 may be coupled to the rotor core 150 through various schemes including burying in the rotor core 150.

The rotor core 150 corresponds to a part of the rotor 120 except for the module 140. The rotor core 150 may be formed at the center thereof with a hole and include soft magnetic material. The soft magnetic material may be a thin electric steel sheet. The rotor core may be formed by stacking thin electric steel sheets or soft magnetic composite (SMC) formed by insulating small magnetic particles each having a size of several meters. The shaft 130 is inserted in the hole, so that the shaft 130 is coupled to the rotor core 150. Accordingly, the shaft 130 rotates by the rotation of the rotor 120. The shaft 130 includes non-magnetic material.

Figure 2:
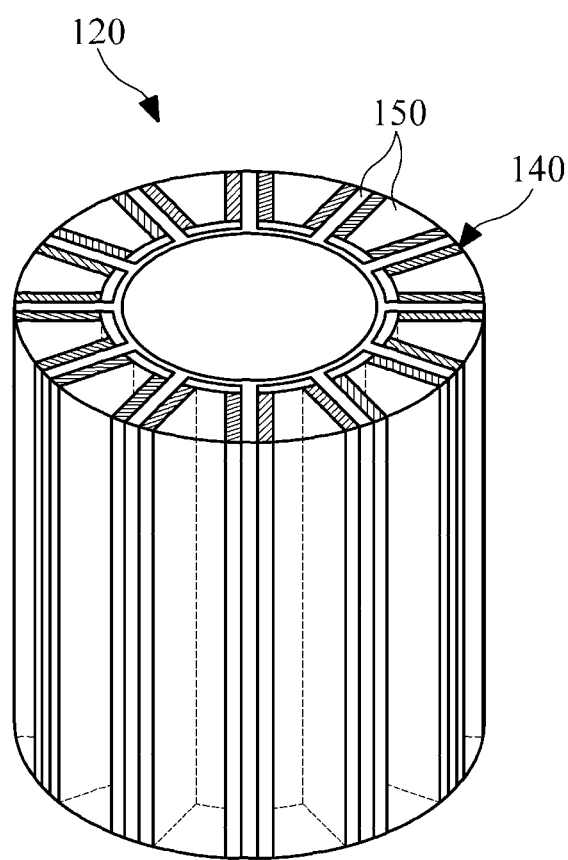
FIG. 2 is a perspective view showing the configuration of a rotor according to an exemplary embodiment.

FIG. 2 is a perspective view showing the configuration of a rotor according to an exemplary embodiment.

As shown in FIGS. 1 and 2, the rotor 120 may include the module 140 and the rotor core 150. The module 140 may be buried in the rotor core 150 to be coupled to the rotor core 150. The method of coupling the module 140 to the rotor core 150 is not limited thereto and may be implemented through various schemes.

Figure 3:
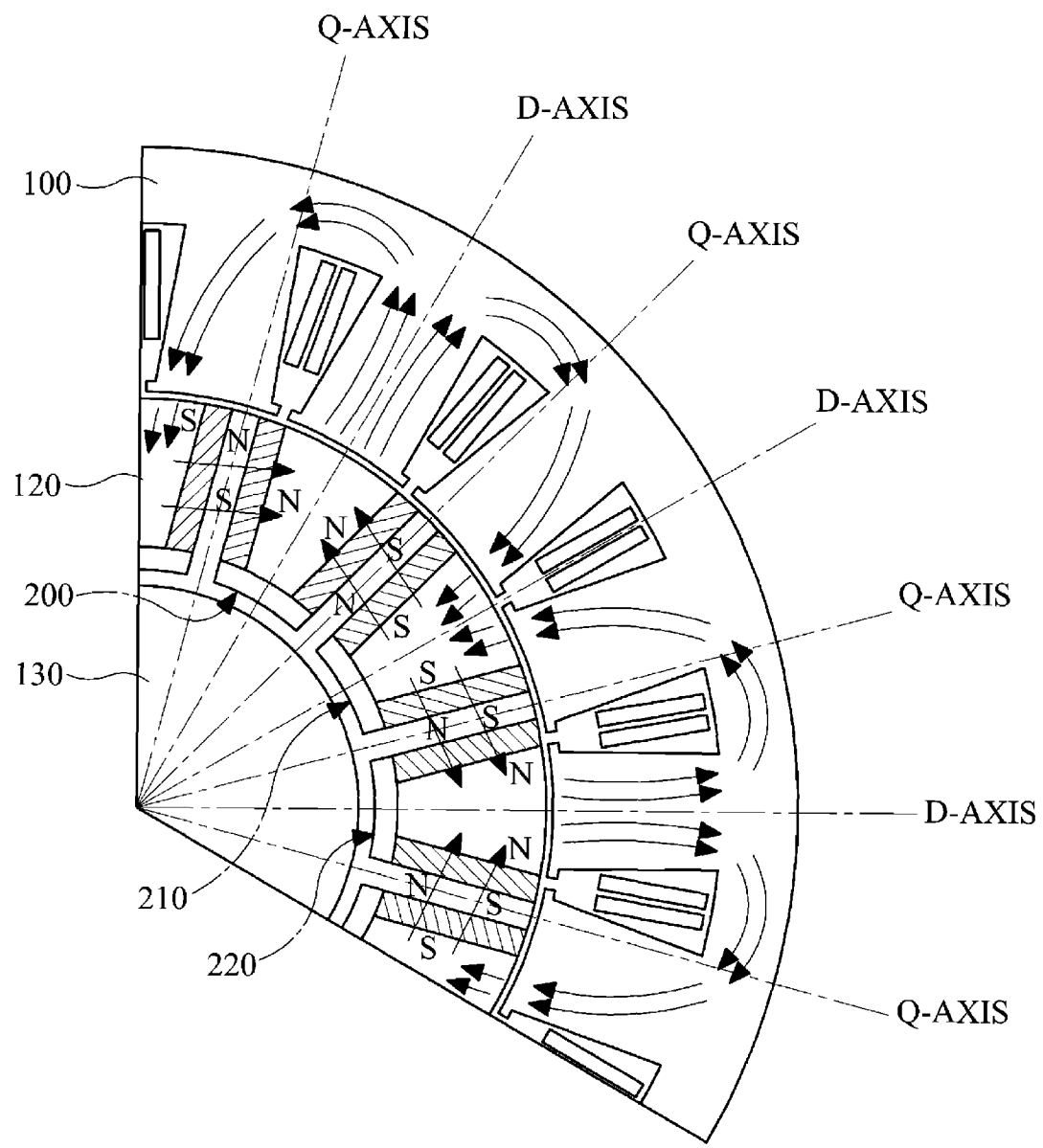
FIG. 3 is a cross sectional view partially showing the motor which describes the magnetization direction passing through permanent magnets according to an exemplary embodiment.

FIG. 3 is a cross sectional view partially showing the motor to describe the magnetization direction passing through permanent magnets according to an exemplary embodiment.

As shown in FIGS. 1 and 3, the motor 10 includes the stator 100, the rotor 120 and the shaft 130. Hereinafter, a q-axis is referred to as an axis proceeding from the center of rotation and passing between adjacent two modules, and a d-axis is referred to as an axis proceeding from the center of rotation and passing through the inside of the module.

In FIG. 3, a part of the motor is shown. The rotor 120 includes a first module 200, a second module 210 and a third module 220. The first module 200 includes a pair of permanent magnets, the facing inner sides of which are magnetized with N poles. Accordingly, the magnetic flux, which is generated by the permanent magnets, flows in the direction passing from the outside of the permanent magnets of the first module 200 to the inside of the module through the permanent magnets of the first module 200 and then proceeds to the stator 100. The magnetic flux having reached the stator 100 flows to the second module 210 or a module (not shown)

disposed on the left side of the first module 200 by passing through the stator 100. In this case, the first module 200 serves as an N pole.

The second module 210 includes a pair of permanent magnets, the facing inner sides of which are magnetized with S poles. Accordingly, the magnetic flux, which is generated by the permanent magnets, flows in the direction passing from the stator 100 to the inside of the permanent magnets of the second module 210, passes through the permanent magnets of the second module 210 to the outside of the permanent magnets of the second module 210, and then proceeds to other modules 200 and 220. The magnetic flux having reached other modules 200 and 220 may flow to the inside of the permanent magnets by passing through the permanent magnets. In this case, the second module 210 serves as an S pole.

The third module 220 includes a pair of permanent magnets, the facing inner sides of which are magnetized with N poles. Accordingly, the magnetic flux, which is generated by the permanent magnets of the third module 220, flows in the direction passing from the outside of the permanent magnets of the third module 220 to the inside of the module through the permanent magnets of the third module 220 and then proceeds to the stator 100. The magnetic flux having reached the stator 100 flows to the second module 210 or a module (not shown) disposed on the right side of the third module 220 by passing through the stator 100. In this case, the third module 220 serves as an N pole.

Although not shown, each of the modules 200, 210 and 220 included in the rotor 120 may be provided in even number.

Figure 4:
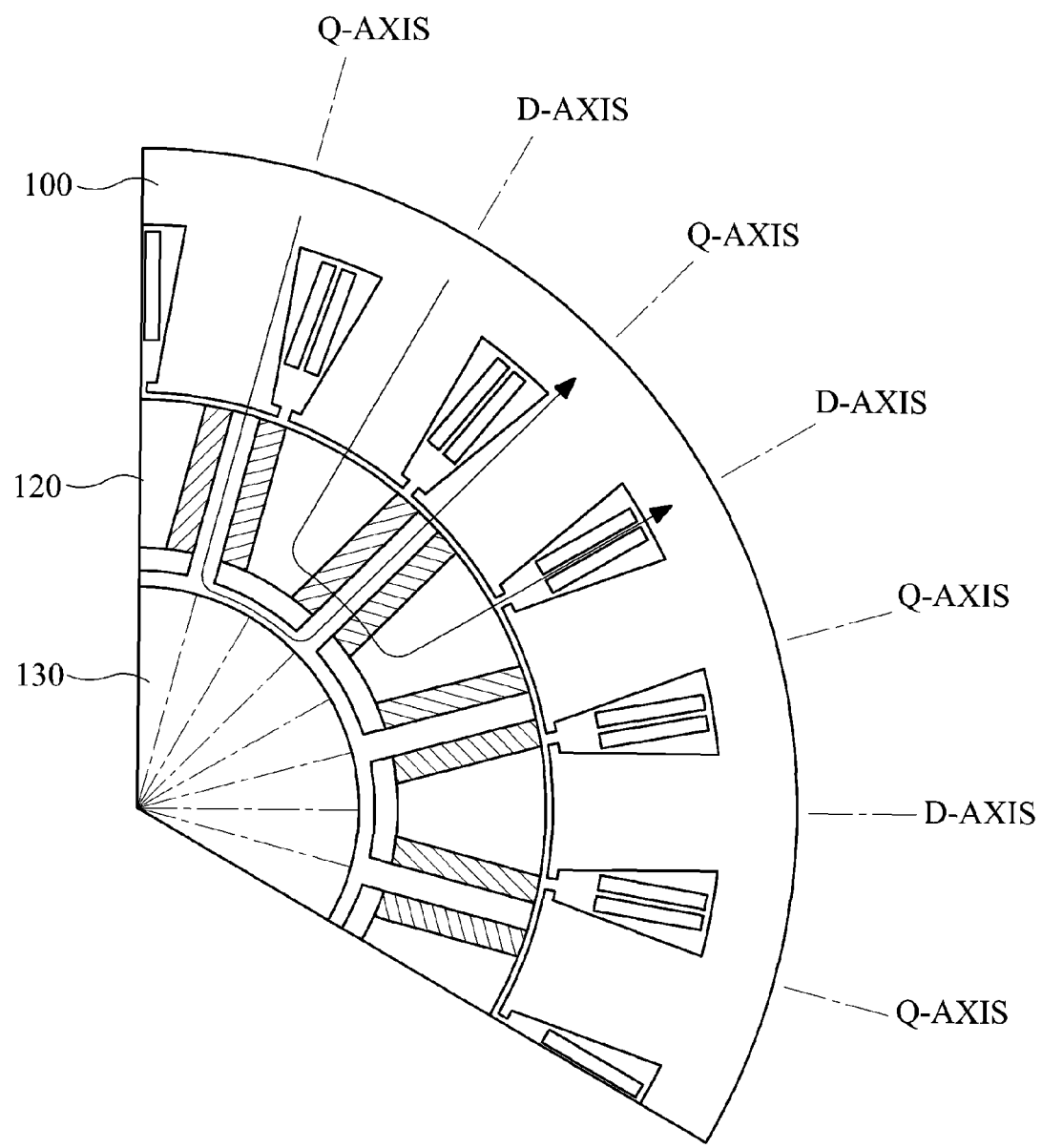
FIG. 4 is a cross sectional view of a part of the motor showing the path of a magnetic flux generated by a d-axis current and a q-axis current according to an exemplary embodiment.

FIG. 4 is a cross sectional view of a part of the motor showing the path of a magnetic flux generated by a d-axis current and a q-axis current according to an exemplary embodiment.

As shown in FIGS. 1 and 4, the motor 10 includes the stator 100, the rotor 120 and the shaft 130. Hereinafter, a q-axis is referred to as an axis proceeding from the center of rotation and sequentially passing between adjacent two modules, and a d-axis is referred to as an axis proceeding from the center of rotation and passing through the inside of the module.

The torque of the motor 10 is calculated through equation 1 below.

$$\text{Torque} = P_n\{\phi_f i_q + (L_d - L_q) i_d i_q\} \quad \text{[Equation 1]}$$

Herein, $P_n$ represents the number of pair poles and $\Phi_f$ represents the flux linkage by a permanent magnet, $i_d$ and $L_d$ represent the d-axis current and the d-axis inductance, respectively, and $i_q$ and $L_q$ represent the q-axis current and the q-axis inductance, respectively.

In the above equation, the first term corresponding to $P_n*\Phi_f*i_q$ represents a magnetic torque and the second term corresponding to $P_n*(L_d-L_q)*i_d*i_q$ represents a reluctance torque. At low level driving speeds, the q-axis current is dominant, so the torque of the motor is substantially dependent on the magnetic torque. Meanwhile, at high level driving speeds, the q-axis current is reduced and the d-axis current of negative (−) is increased, so that the torque of the motor is more dependent on the reluctance torque.

In general, the q-axis inductance ($L_q$) is greater than the d-axis inductance ($L_d$), the d-axis current ($i_d$) is negative and the q-axis current ($i_q$) is positive. Since the q-axis inductance ($L_q$) is greater than the d-axis inductance ($L_d$), the d-axis inductance ($L_d$) minus the q-axis inductance ($L_q$) is a negative value. Since the d-axis current ($i_d$) is negative and the q-axis current ($i_q$) is positive, the reluctance torque has a positive value.

When the path of a magnetic flux generated by the q-axis current is viewed with reference to FIGS. 1 and 4, the path of the magnetic flux passes through a gap between the stator 100, the rotor core 150, and a part of the rotor core 150. That is, in the path of the magnetic flux generated by the q-axis current, only the gap between stator 100 and the rotor core 150 serves as a factor impeding the flow of the magnetic flux, so that the magnetic flux generated per electric current is great. That is, the q-axis inductance ($L_q$) is great.

When the path of a magnetic flux generated by the d-axis current is viewed, the path of the magnetic flux passes through two permanent magnets in addition to a gap between the stator 100 and the rotor core 150. That is, the gap and the two permanent magnets exist in the path of the magnetic flux generated by the d-axis current, so that resistance to the flow of the magnetic flux is great. Accordingly, the magnetic flux generated per electric current is small. That is, the d-axis inductance ($L_d$) is small.

As described above, the example of the rotor structure enables the q-axis inductance to be increased, so that the value of $L_d-L_q$ is increased, and thus the reluctance torque is increased. Since the reluctance torque, which has a great influence on the total torque of the motor at high level driving speeds, is increased, the motor maintains high power operation even at high level driving speeds.

In addition, the motor 140 includes the first connection part 142 including non-magnetic material or air, thereby preventing the magnetic flux generated from the permanent magnet 141 from leaking to the inner side of the rotor core 150. That is, the first connection part 142 prevents some of the magnetic flux generated by the permanent magnet 141 from leaking to the inner side of the rotor core 150, thereby improving the performance of the motor 10. The non-magnetic material may be a material having a permeability of about "1" and may be made of aluminum, plastic, fiber reinforced plastic (FRP), or the like may be used.

Figure 5A:
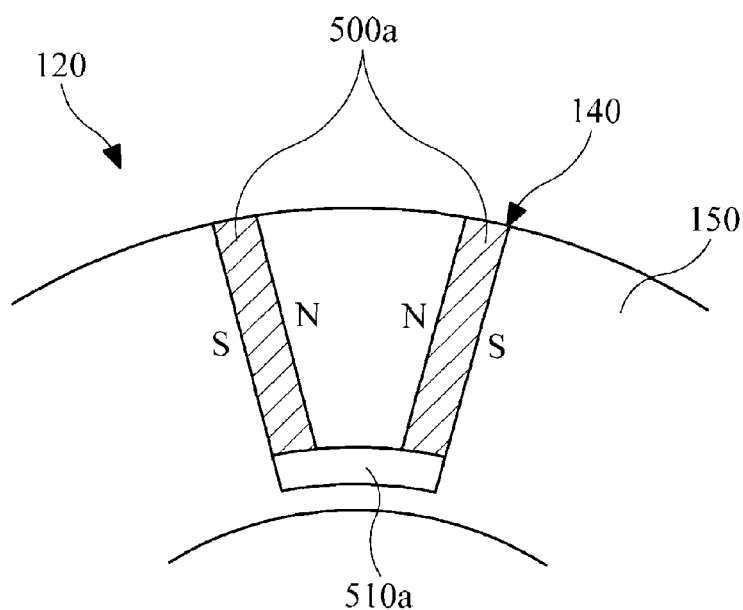
FIGS. 5A, 5B, 5C and 5D are views showing examples of a module according to aspects of the exemplary embodiments.
Figure 5B:
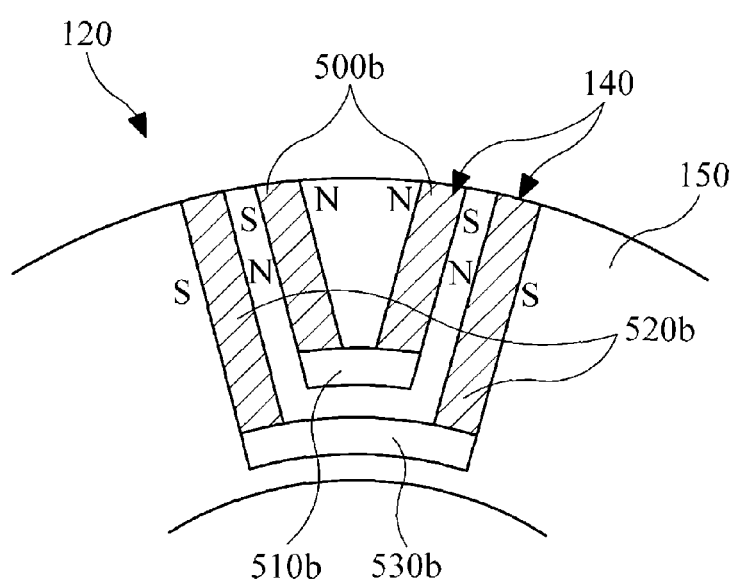
Figure 5C:
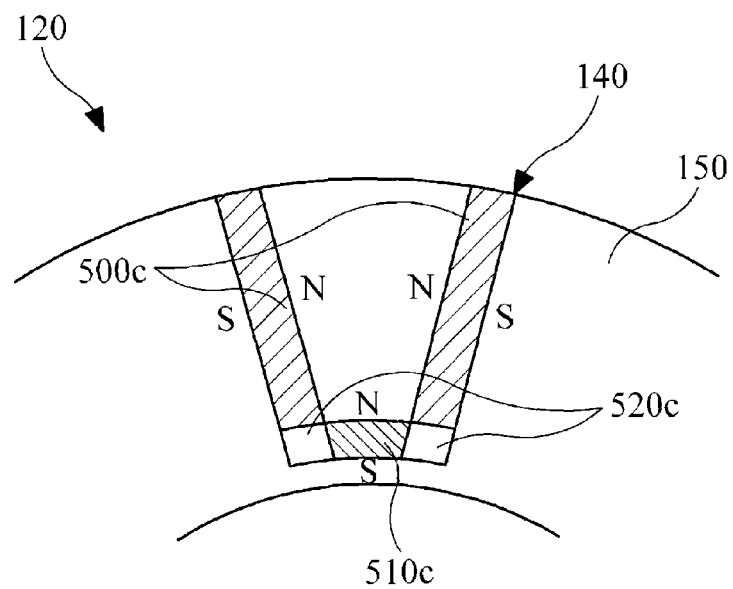

FIGS. 5A, 5B and 5C are views showing a module according to aspects of the exemplary embodiments. According to an aspect of exemplary embodiment, the range of the length, width, distance, and angles in which the first permanent magnets 141 and the first connection part 142 are arranged may vary.

As shown in FIGS. 1 and 5A, the module 140 of the rotor 120 may include a pair of first permanent magnets 500a and a first connection part 510a. The first connection part 510a connects ends of the pair of first permanent magnets 500a to each other. For example, the first connection part 510a connects the ends adjacent to the inner side of the rotor core 150 of the first permanent magnets 500a to each other. The first connection part 510a includes non-magnetic material or air. The first connection part 510a is spaced apart from the inner surface of the rotor core 150.

The inner sides of the first permanent magnets 500 which face each other may be magnetized with N poles or S poles. Therefore, the magnetization is achieved in the direction proceeding from the outside of the first permanent magnets 500a to the inside of the first permanent magnets 500a by passing through the first permanent magnets 500a, or the opposite direction.

As shown in FIGS. 1 and 5B, the module 140 of the rotor 120 may include a pair of first permanent magnets 500b, a first connection part 510b, a pair of second permanent magnets 520b and a second connection part 530b.

The first connection part 510b connects ends of the first permanent magnets 500b to each other. For example, the first connection part 510b connects the ends of the first permanent magnets 500b adjacent to the inner side of the rotor core 150 to each other. The first connection part 510b may include non-magnetic material or air. The first connection part 510b is spaced from the inner surface of the rotor core 150.

The first connection part 510b may include a center, referred to as connection part 510c in FIG. 5C, which is formed using hard magnetic material.

The pair of second permanent magnets 520b is spaced apart from the pair of the first permanent magnets 500b.

The second connection part 530b connects the ends of the second permanent magnets 520b to each other. For example, the second connection part 530b may connect the ends of the second permanent magnets 520b adjacent to the inner side of the rotor core 150 to each other. The second connection part 530b may include non-magnetic material or air. The second connection part 530b is spaced apart from the inner surface of the rotor core 150.

That is, the module 140 including the first permanent magnets 500b and the first connection part 510b may further include another module including the second permanent magnets 520b and the second connection part 530b.

The inner sides of the first permanent magnets 500b which face each other may be magnetized with N poles or S poles. The inner sides of the second permanent magnet 520b which face each other are magnetized with the same poles as those of the first permanent magnets 500b.

Accordingly, the magnetization is achieved in the direction proceeding from the outside of the second permanent magnets 520b to the inside of the first permanent magnets 500b by passing through the second permanent magnets 520b and the first permanent magnets 500b, or the opposite direction.

If the number of the permanent magnets is increased, the magnetic flux generated by the permanent magnets is increased and the performance of the motor 10 is improved. In addition, the increase of the number of the permanent magnets increases the paths of magnetic flux generated by q-axis current, so that the q-axis inductance is increased and the performance of the motor 10 is improved.

As shown in FIGS. 1 and 5C, the module 140 of the rotor 120 includes a pair of permanent magnets 500c and first connection parts including a center part 510c and remaining parts 520c.

The first connection parts 510c and 520c connect ends of the first permanent magnets 500c to each other. For example, the first connection parts 510c and 520c connect ends of the first permanent magnets 500c adjacent to the inside of the rotor core 150 to each other. The first connection parts 510c and 520c are spaced apart from the inner surface of the rotor core 150.

The center part 510c of the first connection parts 510c and 520c includes a permanent magnet or air, and the remaining parts 520c include non-magnetic material or air.

Facing inner sides of the first permanent magnets 500c may be magnetized with N poles or S poles, and the center part 510c is magnetized with a predetermined pole capable of increasing the total magnetic flux generated in the module 140. For example, the inner side of the center part 510c of the first connection parts has the same pole as the facing inner sides of the first permanent magnets 500c.

Accordingly, the magnetization is achieved in the direction proceeding from the outside of the first permanent magnets 500c to the inside of the first permanent magnets 500c by passing through the first permanent magnets 500c, or in the opposite direction.

As described above, the adding of the center part 510c formed using a hard magnetic material magnet increases the magnetic flux generated by the permanent magnets 500c. Accordingly, the performance of the motor 10 is improved.

Figure 5D:
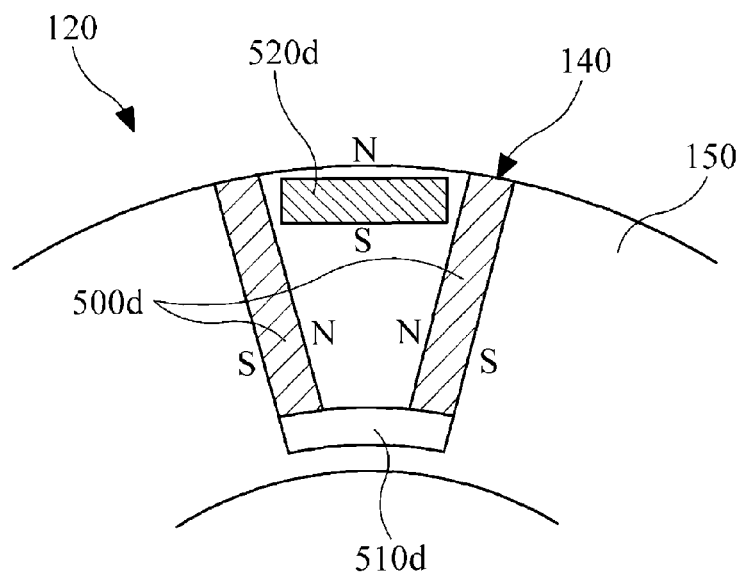

As shown in FIGS. 1 and 5D, the module 140 of the rotor 120 includes a pair of first permanent magnets 500d, a first connection part 510d and a third permanent magnet 520d.

The first connection part 510d connects ends of the first permanent magnets 500d to each other. For example, the first connection part 510d connects ends of the first permanent magnets 500d adjacent to the inner side of the rotor core 150 to each other. The first connection part 510d includes non-magnetic material or air. The first connection part 510d is spaced apart from the inner surface of the rotor core 150.

The third permanent magnet 520d is disposed at an outer side of the rotor core 150 between the first permanent magnets 500d.

The first permanent magnets 500d needs to be magnetized such that N poles or S poles face each other and the third permanent magnet 520d needs to be magnetized in the direction capable of increasing the total magnetic flux generated in the module 140.

To this end, facing inner sides of the first permanent magnets 500d are magnetized with N poles or S poles, and the third permanent magnet 520d has a pole capable of increasing the total magnetic flux generated in the module 140. For example, if the inner sides of the first permanent magnets 500d are magnetized with N poles, a lower side of the third permanent magnet 520d is magnetized with an N pole and an upper side of the third permanent magnet 520d is magnetized with an S pole.

As described above, the adding of the third permanent magnet 520d increases the magnetic flux generated by the permanent magnets 500d. Accordingly, the performance of the motor 10 is improved.

Figure 6A:
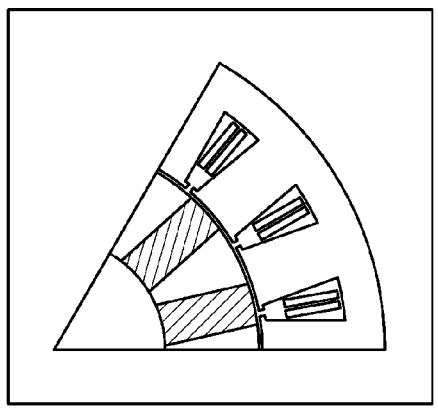
FIGS. 6A, 6B and 6C are views used to explain the performance of the motor according to aspects of the exemplary embodiments.
Figure 6A:
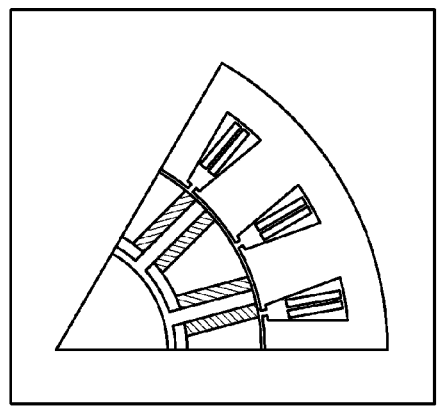
Figure 6B:
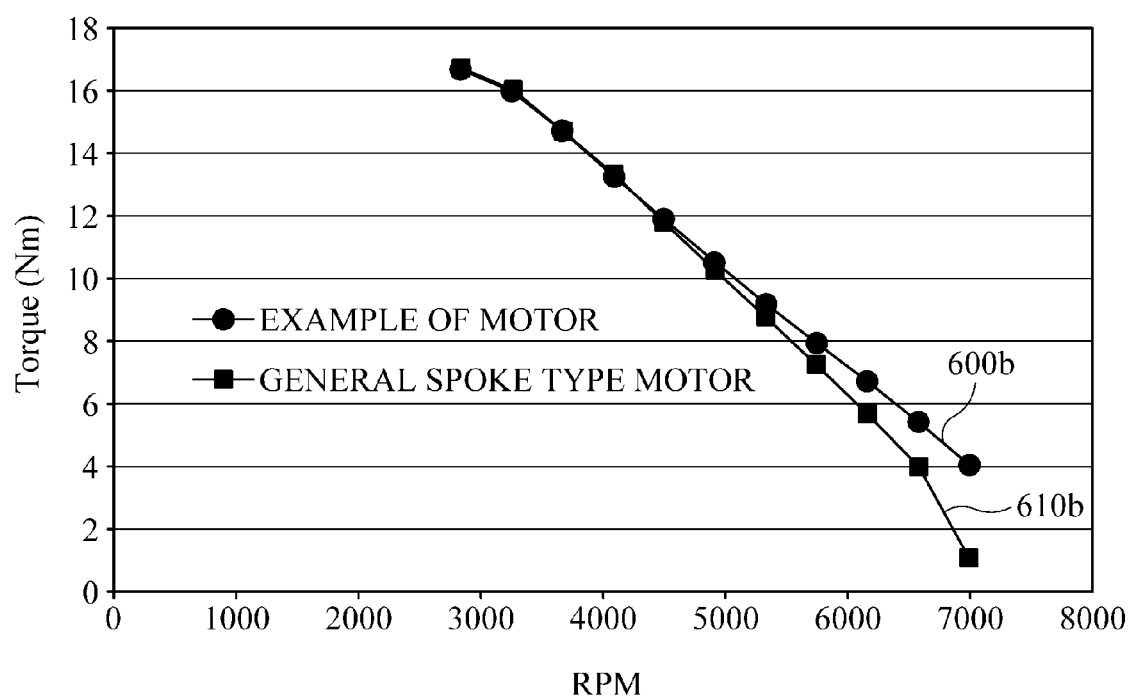
Figure 6C:
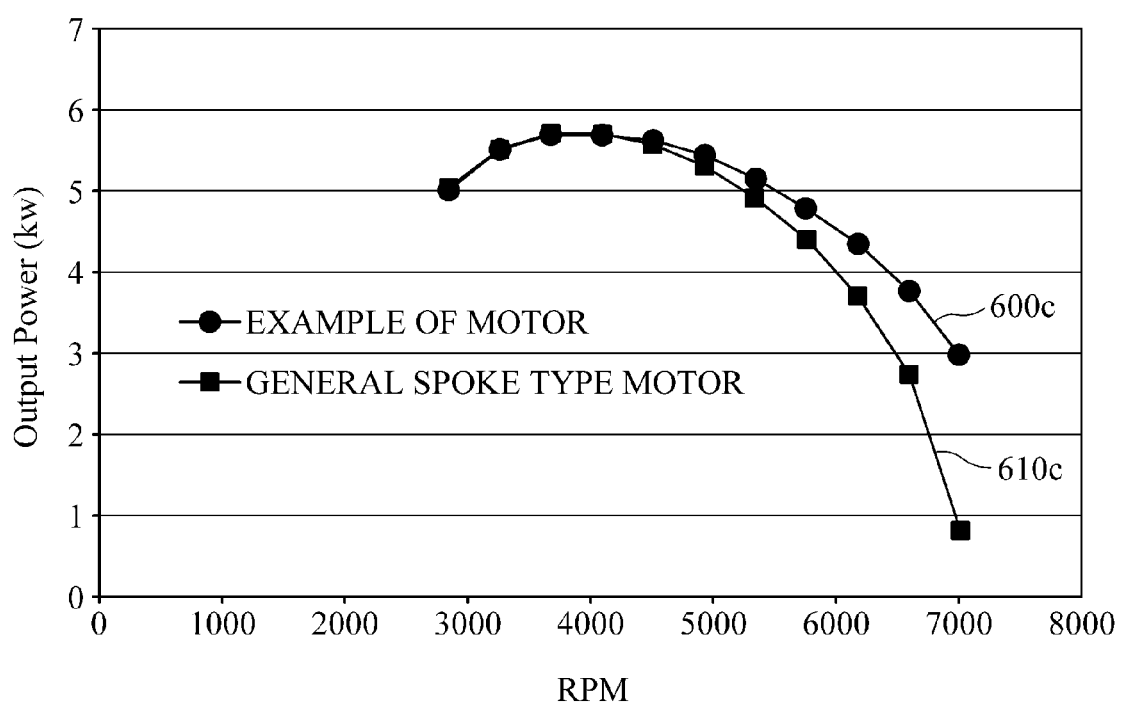

FIGS. 6A, 6B and 6C are views used to explain the performance of the motor according to aspects of the exemplary embodiments. A simulation result is provided through a simulation software program name Maxwell for electromagnetic design of a motor.

As shown in Equation 1 and FIG. 6A, a general spoke type motor has a d-axis inductance ($L_d$) of 0.160 mH, a q-axis inductance ($L_q$) of 0.202 mH, and has an inductance difference ($L_q - L_d$) of 0.042 mH. Meanwhile, the motor according to an exemplary embodiment, which uses the same amount of magnets as the general motor, has a d-axis inductance ($L_d$) of 0.159 mH, a q-axis inductance ($L_q$) of 0.228 mH, and has an inductance difference ($L_q - L_d$) of 0.069 mH. The inductance difference ($L_q - L_d$) of the motor of the exemplary embodiment is greater than that of the general spoke type motor by 62.8% as shown in 600a in FIG. 6A. That is, the motor according to an exemplary embodiment has an inductance difference ($L_q - L_d$) greater than that of the general motor.

As describe above, the motor according to an exemplary embodiment has an inductance difference ($L_q - L_d$) greater than that of the general motor, so that the reluctance torque is increased. At high level driving speeds, the reluctance torque has a greater influence on the total torque of the motor than the magnetic torque does. Accordingly, the motor according to an exemplary embodiment can provide higher power operation at high level driving speeds than the general spoke type motor.

FIG. 6B shows the torque of a motor with rise of rotational speed of the motor. As shown in FIG. 6B, when the RPM rises, the motor according to an exemplary embodiment shows a smooth torque drop as compared with the general spoke type motor (see 600b of FIG. 6B). That is, the motor according to an exemplary maintains a high level of torque even if the RPM rises. Meanwhile, the torque of the general spoke type motor rapidly drops with a rise of RPM (see 610b of FIG. 6B).

As described above, the example of the motor maintains a high level of torque even if the driving speed is increased.

Although an exemplary embodiment of the inventive concept has been described for illustrative purposes, those skilled in the art will appreciate that various modifications, additions and substitutions are possible, without departing from the scope and spirit of the inventive concept as disclosed in the accompanying claims.

What is claimed is:

1. A rotor comprising:
   a rotor core with a hole coupled to a shaft disposed at a center of the rotor; and
   first modules and second modules alternately disposed next to each other with a gap of a constant width in the rotor core, each module comprising:
   a pair of first permanent magnets spaced apart from each other;
   a first connection part which connects ends of the first permanent magnets to each other;
   a pair of second permanent magnets spaced apart from the first permanent magnets; and
   a second connection part which connects the ends of the second permanent magnets to each other,
   wherein the first permanent magnets of the first modules have an N pole on their sides facing the gap, while the first permanent magnets of the second modules have an S pole on their sides facing the gap, and
   wherein the pair of second permanent magnets are magnetized with the same poles as the first permanent magnets.

2. The rotor of claim 1, wherein the first connection part connects the ends adjacent to an inner side of the rotor core to each other.

3. The rotor of claim 1, wherein the first connection part is spaced apart from an inner surface of the rotor core.

4. The rotor of claim 1, wherein the modules comprise:
   a third permanent magnet which is disposed at an outer side of the rotor core between the first permanent magnets,
   wherein the third permanent magnet has a pole capable of increasing the total magnetic flux generated in the module.

5. The rotor of claim 1, wherein the modules are disposed on the rotor core spaced apart from an inner surface of the rotor core.

6. The rotor of claim 1, wherein the modules are buried in the rotor core.

7. The rotor of claim 1, wherein the first connection part comprises:
   a center part comprising a permanent magnet; and
   a remaining part comprising non-magnetic material or air.

8. The rotor of claim 1, wherein the first connection part comprises non-magnetic material or air, and
   wherein the rotor core comprises soft magnet material.

9. A motor comprising:
   a rotor comprising a rotor core with a hole coupled to a shaft disposed at a center of the rotor;
   a stator spaced apart from the rotor comprising at least one slot around which coil is wound; and
   first modules and second modules alternately disposed next to each other with a gap of a constant width in the rotor core, each module comprising:
   a pair of first permanent magnets spaced apart from each other;
   a first connection part which connects ends of the first permanent magnets to each other;
   a pair of second permanent magnets spaced apart from the first permanent magnets; and
   a second connection part which connects the ends of the second permanent magnets to each other,
   wherein the first permanent magnets of the first modules have an N pole on their sides facing the gap, while the first permanent magnets of the second modules have an S pole on their sides facing the gap, and
   wherein the pair of second permanent magnets are magnetized with the same poles as the first permanent magnets.

10. The motor of claim 9, wherein the first connection part connects the ends of the first permanent magnets adjacent to an inner surface of the rotor core to each other and the first connection part is spaced apart from the inner surface of the rotor core.

11. The motor of claim 9, wherein the modules comprise:
    a third permanent magnet which is disposed at an outer side of the rotor core between the first permanent magnets,
    wherein the third permanent magnet has a pole capable of increasing the total magnetic flux generated in the module.

12. The rotor of claim 9, wherein the modules are disposed on the rotor core spaced apart from an inner surface of the rotor core.

13. The motor of claim 9, wherein the first connection part comprises:
    a center part comprising permanent magnet; and
    a remaining part comprising non-magnetic material or air.

14. The motor of claim 9,
    wherein the first connection part comprises non-magnetic material or air, and
    wherein the rotor core comprises soft magnet material.

15. A rotor core comprising:
    a soft magnet material; and
    first modules and second modules alternately disposed next to each other with a gap of a constant width in the rotor core, each module comprising:
    a pair of first permanent magnets spaced apart from each other;
    a first connection part which connects ends of the first permanent magnets to each other;
    a pair of second permanent magnets spaced apart from the first permanent magnets; and
    a second connection part which connects the ends of the second permanent magnets to each other,
    wherein the first permanent magnets of the first modules have an N pole on their sides facing the gap, while the first permanent magnets of the second modules have an S pole on their sides facing the gap, and
    wherein the pair of second permanent magnets are magnetized with the same poles as the first permanent magnets.

16. The rotor core of claim 15, wherein the modules further comprise:
    a third permanent magnet which is disposed at an outer side of the rotor core between the first permanent magnets,
    wherein the third permanent magnet has a pole capable of increasing the total magnetic flux generated in the module.

17. The rotor of claim 15, wherein the first connection part comprises:
    a center part comprising a permanent magnet; and
    a remaining part comprising non-magnetic material or air.

18. A set of modules for a rotor core comprising:
    first modules and second modules alternately disposed next to each other with a gap of a constant width in the rotor core, each module comprising:
    a pair of first permanent magnets spaced apart from each other;
    a first connection part which connects ends of the first permanent magnets to each other;

a pair of second permanent magnets spaced apart from the first permanent magnets; and a second connection part which connects the ends of the second permanent magnets to each other, wherein the first permanent magnets of the first modules have an N pole on their sides facing the gap, while the first permanent magnets of the second modules have an S pole on their sides facing the gap, and wherein the pair of second permanent magnets are magnetized with the same poles as the first permanent magnets.

19. The set of modules for a rotor core of claim 18, wherein the modules further comprise:

a third permanent magnet which is disposed at an outer side of the rotor core between the first permanent magnets, wherein the third permanent magnet has a pole capable of increasing the total magnetic flux generated in the module.

20. The set of modules for a rotor core of claim 18, wherein the first connection part comprises:

a center part comprising a permanent magnet; and a remaining part comprising non-magnetic material or air.

\* \* \* \* \*